Inventor
RONALD HAMER
By Cushman, Darby & Cushman
Attorneys

Inventor
By RONALD HAMER
Cushman, Darby & Cushman
Attorneys

Inventor
By RONALD HAMER
Cushman, Darby & Cushman
Attorneys

Inventor
By RONALD HAMER
Cushman, Darby & Cushman
Attorneys

Inventor
By RONALD HAMER
Cushman, Darby & Cushman
Attorneys

United States Patent Office 3,427,561

Patented Feb. 11, 1969

3,427,561

FREQUENCY SYNTHESISERS WITH STEPWISE CHANGEABLE OUTPUT FREQUENCIES

Ronald Hamer, Cheltenham, England, assignor to Minister of Technology in Her Britannic Majesty's Government of the United Kingdom of Great Britain and Northern Ireland, London, England Filed Apr. 21, 1967, Ser. No. 632,625
Claims priority, application Great Britain, Apr. 22, 1966, 17,677/66; Nov. 25, 1966, 52,893/66
U.S. Cl. 331—19 23 Claims
Int. Cl. H03b 3/08, 3/04

ABSTRACT OF THE DISCLOSURE

A synthesiser comprising a tunable oscillator phase or frequency locked to any one of a comb of harmonics, a frequency $\delta f$ apart, produced by a stable oscillator and harmonic generator. The outputs from the harmonic generator and the tunable oscillator are mixed and passed through a band pass filter having a center frequency which may be any odd multiple of $\delta f/4$. The filter output is applied to a threshold circuit which is arranged to change the content of a counter by unity each time the frequency of the tunable oscillator is changed to another harmonic and the filter output reaches a predetermined threshold amplitude.

The present invention relates to frequency synthesisers. Such synthesisers may be used to provide variable-frequency local oscillators for superheterodyne receivers.

Frequency synthesisers hitherto used or proposed have been bulky and also expensive to manufacture. One such known synthesiser comprises a Klystron oscillator which is phase-locked to a crystal-controlled synthesiser.

It is an object of the present invention to provide a frequency synthesiser which can be made in a compact form and which is relatively inexpensive to make.

According to the present invention, there is provided a frequency synthesiser including a stable oscillator and harmonic generator for providing a comb-like spectrum of signals having equally spaced frequencies $\delta f$ apart, a controlled frequency oscillator, a mixer connected to the output of the controlled frequency oscillator and to the output of the stable oscillator and harmonic generator, a band-pass filter connected to the output of the mixer, the centre frequency of the band pass filter being an odd multiple of $\delta f/4$ and the bandwidth of the band-pass filter being not greater than $\delta f/2$, a phase comparator or frequency discriminator connected to the output of the filter to provide an output representative of the deviation of the filter output signal from a predetermined phase or a predetermined frequency respectively, means connecting the output of the phase comparator or the frequency discriminator to a control input of the controlled frequency oscillator to lock the frequency thereof, a detector connected to the output of the filter, a digital counter, means for altering the content of the counter by unity when the output from the detector reaches a predetermined threshold level and means for applying a signal to the controlled frequency oscillator to force it to change its frequency of oscillation. There may also be provided circuits for maintaining the content of the counter in correspondence with the frequency of the voltage controlled oscillator even when reversals in the direction of tuning are made at random. The band-pass filter may comprise an intermediate frequency amplifier. According to a feature of the present invention, there is provided means for effectively changing the sense of control of the controlled frequency oscillator by the phase comparator or the frequency discriminator each time the output from the detector reaches the predetermined threshold level.

Figure 1:
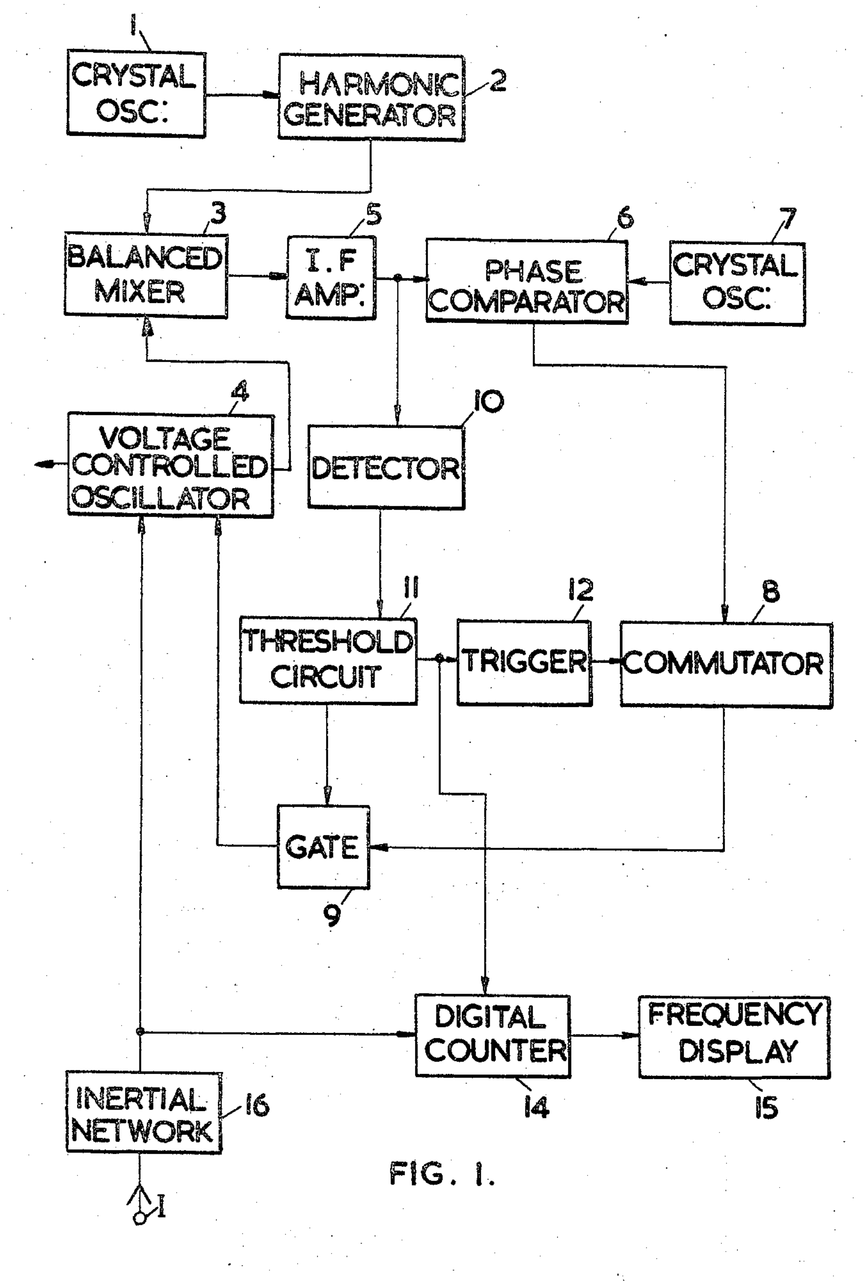
Figure 2:
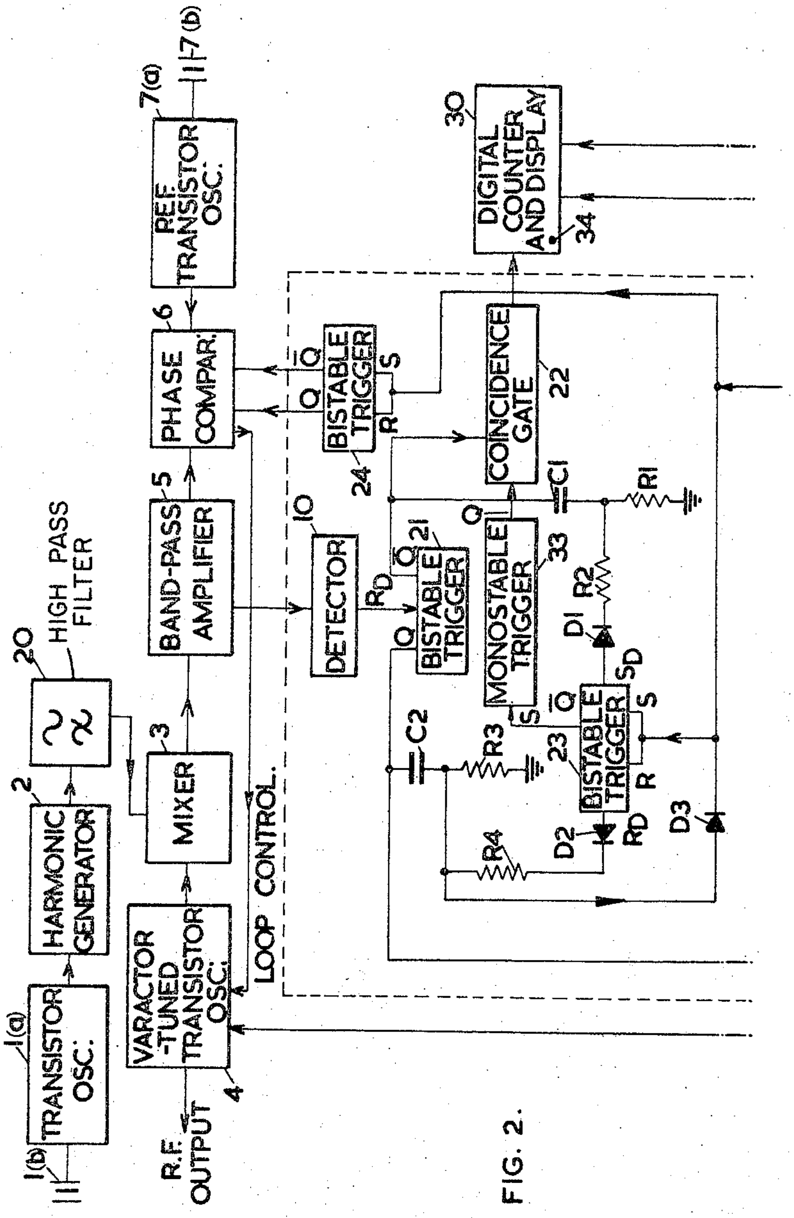
Figure 2A:
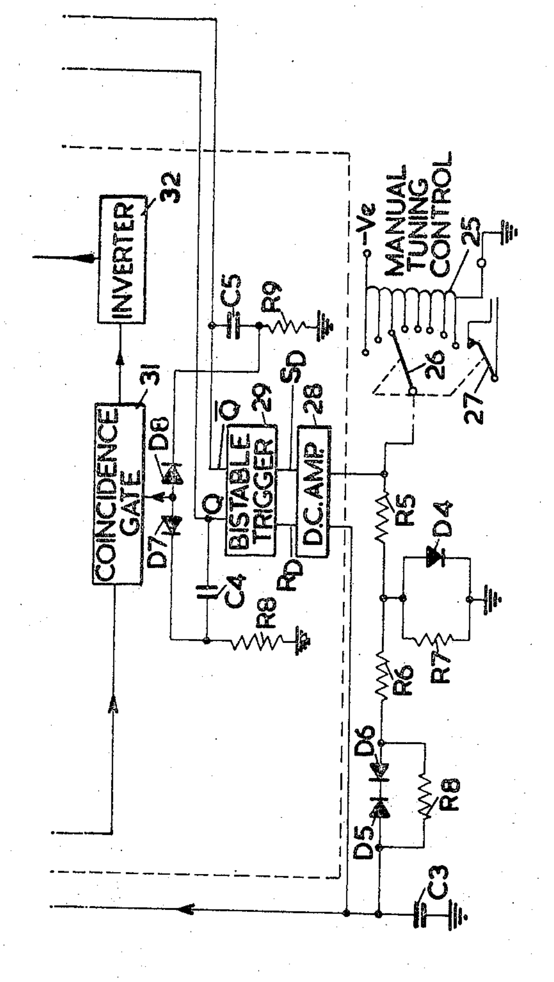
Figure 3:
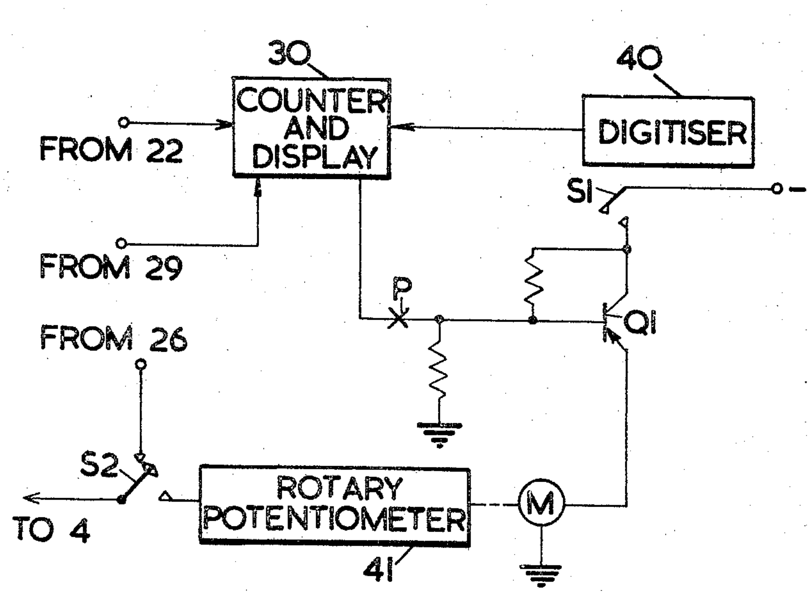
Figure 4:
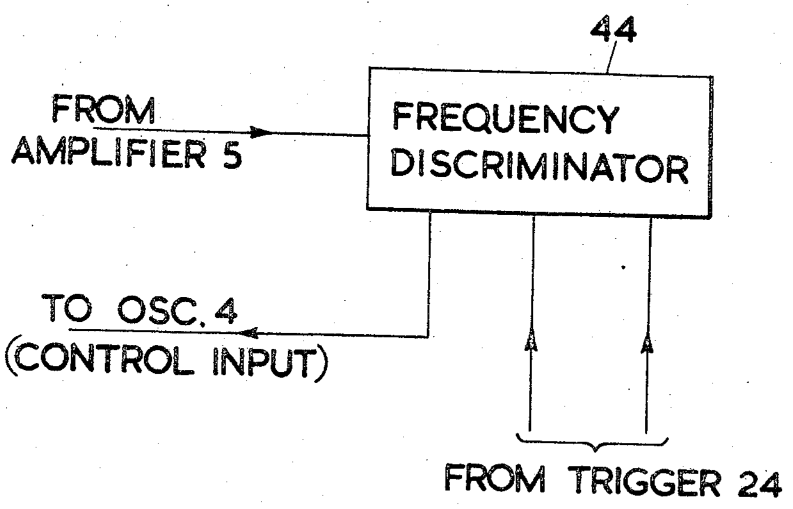

In order that the invention may be more clearly understood embodiments of the invention will now be described, by way of example, with reference to the accompanying drawings, of which:

FIGURE 1 is a block circuit diagram of a frequency synthesiser,

FIGURES 2 and 2A together constitute a block circuit diagram of an alternative form of frequency synthesiser, FIGURE 3 is a block circuit diagram of a digital tuning arrangement for the synthesiser shown in FIGURE 2, and FIGURE 4 is a block circuit diagram illustrating a modification of a part of the synthesiser of FIGURE 2.

FIGURE 1 shows a crystal oscillator 1 of high stability feeding a harmonic generator 2. The harmonic generator 2 generates a comb-like spectrum of frequencies at intervals of frequency $\delta f$. The output of the harmonic generator 2 is applied to a balanced mixer 3 to which is also applied the output of a controlled frequency oscillator in the form of a voltage-controlled oscillator 4. The output of the mixer 3 is amplified in an intermediate frequency amplifier 5 which acts inter alia as a band-pass filter having a narrow bandwidth of about $\delta f/20$ centred on a frequency of $3\delta f/4$. The output of the amplifier 5 is applied to a phase comparator 6 in which the phase of the signal from the amplifier 6 is compared with the phase of a signal from a high stability crystal oscillator 7. The oscillator 7 has an output frequency equal to the centre frequency of amplifier 5 (that is to say, a frequency of $3\delta f/4$).

The output of the phase comparator 6 is applied to an electronic commutator 8, the output of which is applied through a gate 9 to a controlling input of the voltage controlled oscillator 4. The output of the intermediate frequency amplifier 5 is also applied to a detector 10 which controls a threshold circuit 11. One output of the threshold circuit 11 controls the gate 9. A further output of the threshold circuit 11 is applied to a bistable trigger circuit 12 an output of which controls the commutator 8. The further output of the threshold circuit 11 is also applied to a digital counter 14, the content of which is displayed in terms of frequency on a visual display 15. There is also provided an inertial network 16 to which a voltage controlling the output frequency of the synthesiser may be applied at an input I. An output of the inertial network 16 is applied to the voltage controlled oscillator 4 and to the digital counter 14.

The operation of the frequency synthesiser shown in FIGURE 1 will now be described. As hereinbefore stated, the harmonic generator 2 emits a comb-like spectrum of frequencies at intervals of frequency $\delta f$. Let it be assumed that the frequency of the voltage controlled oscillator 4 is forced by the voltage output of the inertial network 16 so that it increases towards a frequency $3\delta f/4$ above one of the comb frequencies. The difference frequency at the output of the balanced mixer 3 will approach $3\delta f/4$ from below this frequency and the amplitude of the signal at the output of the intermediate frequency amplifier 5 will increase until it is at a maximum when the difference frequency reaches $3\delta f/4$. The output of the detector 10, therefore also approaches a maximum and slightly before this maximum is reached the threshold circuit 11 is operated to open the gate 9. The trigger circuit 12 is caused to change state upon the operation of the threshold circuit 11. In this case the trigger circuit 12 is put into a state which sets the commutator 8 so that it will pass the output of the phase comparator 6 directly to the voltage controlled oscillator 4. Also as the difference frequency approaches the frequency of $3\delta f/4$, it is compared in phase in the phase comparator 6 with the signal (of frequency $3\delta f/4$) from the oscillator 7. The resultant phase-dependent voltage from the phase comparator 6 is transmitted through the commutator 8 and the gate 9 to the voltage controlled cillator 4. Also as the difference frequency approaches the outputs of the amplifier 5 and the oscillator 7 are maintained in a fixed phase relationship. When the threshold circuit 11 was operated, an output from this circuit was applied to the digital counter 14 to cause it to count on by unity in a manner to be described hereinafter.

If the frequency of the voltage controlled oscillator 4 is forced to increase further by the output of the inertial network 16, the output from the intermediate frequency amplifier 5 will decrease in amplitude as the output of the balanced mixer 3 increases in frequency above $3\delta f/4$. As this occurs the output from the detector 3 will decrease and will become insufficient to operate the threshold circuit 11. This has no effect on the trigger circuit 12 or the digital counter 14 but it closes the gate 9. This will prevent the output from the phase comparator 6 from resisting any further increase in the frequency of the voltage controlled oscillator 4.

If the frequency of the voltage controlled oscillator 4 is increased still further by a further increase in the output voltage from the inertial network 16, the frequency of the oscillator 4 will approach a frequency of $3\delta f/4$ below the next but one higher comb frequency. The difference frequency at the output of the mixer 3 will approach the frequency of $3\delta f/4$ from above this frequency, the difference frequency so obtained being the so-called image frequency. It will be noted that in this case, the difference frequency will decrease as the frequency of the voltage controlled oscillator 4 increases. Thus the control voltage from the phase comparator 6 must act on the oscillator 4 in an inverse manner to that already described above. This is achieved by the use of the commutator 8 in the following manner. As the difference frequency approaches $3\delta f/4$, the amplitude of the output from the intermediate frequency amplifier 5 will increase. Therefore, the output voltage from the detector 10 will increase so as to operate the threshold circuit 11. Upon the threshold circuit 11 operating, not only is the gate 9 opened once again but the trigger 12 is caused to change its state. This change of state resets the commutator 8 so that the correct inverse polarity of voltage is fed back to the voltage controlled oscillator 4 to maintain its frequency in the correct relationship to the appropriate one of the comb of frequencies from the oscillator 1. Since the controlled frequency of the oscillator 4 frequency is now $3\delta f/4$ below one of the comb frequencies whereas in the previously described condition it was $3\delta f/4$ above the next but one lower comb frequency, the comb frequencies being $\delta f$ apart, the above-mentioned controlled frequencies of the oscillator 4 are $\delta f/2$ apart.

Each time the threshold circuit 11 is operated, when the difference frequency from the balanced mixer 3 approaches $3\delta f/4$, the digital counter 14 is stepped on by unity by an output from the threshold circuit 11 to record a change of $\delta f/2$ in the frequency of the voltage controlled oscillator 4. A frequency corresponding to the count on the counter 14 is displayed on the visual frequency display unit 15. The direction in which the counter 14 counts is controlled by the output of the inertial network 16. Thus, for example, if the output of the inertial network 16 is increasing, the count may be increased and when it is decreasing the count may be decreased. By this means, the frequency display unit 15 is made to display the frequency of the oscillator 4.

When the voltage controlled oscillator 4 is locked onto a required frequency, it may be caused to lock to a higher or to a lower frequency by the application of a suitable increased or decreased voltage to the oscillator 4 from the inertial network 16. When this is done, firstly the threshold circuit becomes unoperated and the gate 9 closes. Then as the frequency of the voltage controlled oscillator 4 approaches the next frequency to which it may be locked (either $\delta f/2$ above or $\delta f/2$ below the previous frequency), the threshold circuit 11 is operated, the state of the trigger 12 is changed and the commutator 8 is set or reset to provide the required sense of control of the voltage controlled oscillator 4 by the phase comparator 6. Also, the gate 9 is opened and the counter 14 is caused to alter its count by unity up or down as the case may be.

In order that the content of the counter should always be representative of the frequency of the voltage controlled oscillator 4, means (not shown) are provided to ensure that before the synthesiser is switched off, a voltage is applied to the controlling input I for a sufficiently long time to allow the controlling input to the oscillator 4 to assume the same voltage. This voltage has such a value as to cause the voltage controlled oscillator to have an output frequency corresponding to the count to which the counter 14 reverts when the synthesiser is switched off. The above-mentioned means is also arranged to apply the same voltage to the input I and thence to the controlling input of the voltage controlled oscillator 4 immediately before the synthesiser is switched on.

As hereinbefore stated, the bandwidth of the intermediate frequency amplifier 5 is about $\delta f/20$, thus ensuring unambiguous operation of the circuit by spurious outputs from the amplifier. The pull-in range of the phase lock loop comprising the mixer 3, the amplifier 5, the phase comparator 6, the commutator 8, the gate 9, the oscillator 7 and the voltage controlled oscillator 4, should be such as to ensure phase-lock of the oscillator 4 once the signal from the mixer 3 is accepted by the amplifier 5. That is to say, the pull-in range should be about $\delta f/40$.

The inertial network 16 is introduced into the circuit to enable rapid tuning of the oscillator 4 to be carried out by a step voltage input to the input I without the rate of change of frequency of the oscillator 4 being so great as to prevent the amplifier 5 from responding adequately to each change of $\delta f/2$ in the frequency of the oscillator 4. This would prevent the required count from being registered in the counter 14 and prevent the trigger circuit 12 from changing its state to control the commutator 8 in the desired manner. The inertial network 16 may be a time constant network of resistors, capacitors and possibly diodes in order to convert a step voltage applied to the input I to a more slowly changing voltage at the input to the voltage controlled oscillator 4. The inertial network 16 may also be used to correct for any non-linearities in the relationship between the frequency of the oscillator 4 and its controlling voltage input.

The circuit described with reference to FIGURE 1 may be modified in a number of ways without departing from the scope of the invention. Thus, for example, the digital counter 14 may be operated by the output of the trigger 12 so that a count is registered either on each change or on alternate changes of state of the trigger 12. Furthermore, the gate 9 may be replaced by a direct connection from the commutator 8 to the oscillator 4. The resulting disturbance of the oscillator 4 by outputs from the phase comparator 6 during tuning changes will only slightly affect the operation of the synthesiser.

The intermediate frequency used for the centre frequency of the intermediate frequency amplifier 5 and the frequency of the output from the oscillator 7 need not be $3\delta f/4$ but may be any other odd multiple of $\delta f/4$. The embodiment of the invention now to be described with reference to FIGURE 2, employs an intermediate frequency amplifier or filter having a centre frequency of $\delta f/4$. In FIGURE 2, those parts of the circuit having substantially the same form and function as corresponding parts of FIGURE 1 are denoted by the same reference numerals.

FIGURE 2 shows a transistor oscillator 1(*a*) controlled in frequency by a crystal 1(*b*). The output of the oscillator 1(*a*) is applied to a harmonic generator 2 in the form of a snap diode frequency multiplier. The output of the harmonic generator 2 is applied to a diode mixer 3 through a high-pass filter 20. An output of a frequency controlled oscillator in the form of a varactor-tuned transistor oscillator 4 is also applied to an input of the diode mixer. The output of the diode mixer 3 is amplified in a band-pass intermediate frequency amplifier 5, which acts as an amplifier and band-pass filter, and is then applied to a phase comparator 6. The other input to the phase comparator 6 is derived from a reference transistor oscillator 7(*a*) which is controlled in frequency by a crystal 7(*b*) and has a frequency equal to the centre frequency of the amplifier 5. The output from the phase comparator 6 is applied to one input of the varactor-tuned oscillator 4.

An output from the amplifier 5 is applied to an envelope detector 10 which is so biassed that it yields a voltage of $-6$ volts when no signal is present on its input and a voltage of $+6$ volts when a maximum-amplitude signal is present on its input. The output from the detector 10 is applied to a change-over input RD of a bistable trigger circuit 21. An output $\overline{Q}$ of the trigger circuit 21 is connected to one input of a coincidence gate 22. The output $\overline{Q}$ is also applied to an input SD of a bistable trigger 23 via a differentiating circuit consisting of a capacitor C1, resistors R1 and R2 and a diode D1. An output Q of the trigger circuit 21 is applied to an input RD of the trigger cricuit 23 via a differentiating circuit consisting of a capacitor C2, resistors R3 and R4, and a diode D2. The signal occurring at the junction of the capacitor C2 and the resistor R3 is applied through a diode D3 to the changeover inputs R and S of the trigger circuit 23 and another bistable trigger circuit 24. Outputs Q and $\overline{Q}$ from the trigger circuit 24 are applied to the phase comparator 6 to control the commutation of its output in a manner to be described hereinafter.

FIGURE 2 also shows a manual tuning control unit comprising a potentiometer 25 connected between a negative voltage supply and earth. The potentiometer 25 has a wiper arm 26 which is arranged selectively to contact various studs tapping the potentiometer 25 at regular intervals. The wiper arm 26 is ganged to a power switch 27 in a manner to be described hereinafter. The wiper arm 26 is electrically connected to one input of a D.C. amplifier 28 and to an input of a linearising network R5, R6, R7 and D4. The output of the linearising network is connected to an inertial network D5, D6, R8, C3. The output of the inertial network is applied to an input of the varactor-tuned oscillator 4 and also to a further input of the D.C. amplifier 28. Outputs of the amplifier 28 are applied to the RD and SD inputs of a bistable trigger circuit 29. Outputs Q and $\overline{Q}$ from the trigger circuit 29 are applied to a digital counter and display 30 in order to control its direction of count. Means 34 may be provided for resetting the counter and display 30 independently of the rest of the circuit. The outputs Q and $\overline{Q}$ from the trigger circuit 29 are also applied to a coincidence gate 31 through differentiating circuits C4, R8 and D7 and C5, R9 and D8 respectively, so that a pulse is applied to the gate 31 when the trigger circuit 29 is put on or off. The output from the gate 31 is applied via an inverting amplifier 32 to the inputs R and S of the trigger circuits 23 and 24. A second input to the gate 31 is derived from the Q output of the trigger circuit 21.

An output $\overline{Q}$ of the trigger circuit 23 is applied to an S input of a monostable trigger circuit 33. An output from the monostable trigger circuit 33 is connected to an input of the coincidence gate 22. The output of the coincidence gate 22 is connected to a counting input of the digital counter and display 30.

The operation of the circuit shown in FIGURE 2 will now be described. First of all, let it be understood that, according to the convention to be used hereinafter, when a bistable trigger circuit is off, there will be a negative voltage at its output Q and a positive voltage at its output $\overline{Q}$ and that when it is on there will be a positive voltage at its output Q and a negative voltage at its output $\overline{Q}$. Each of the gates 22 and 31 are open when a negative voltage is applied thereto. It follows that the gate 22 is open when the gate 31 is shut and vice versa. The output of the trigger circuit 24 controls the phase comparator 6 so that the output of the phase comparator 6 becomes the inverse of its normal output when the trigger circuit 24 is off.

Let it first be assumed that initially the wiper 26 is not in contact with any of the studs of the potentiometer 25, the switch 27 is open and the counter and display 30 registers minimum frequency. If the wiper arm 26 is then moved to contact the earthed stud of the potentiometer 25, the switch 27 will become closed so that the synthesiser is energised. The oscillator 1(*a*) then oscillates and a comb-like spectrum of frequencies $\delta f$ apart will be generated by the harmonic generator 2. The high-pass filter 20 passes only those frequencies of the comb which lie more than $\delta f/4$ above the lowest frequency of the oscillator 4. The amplifier 5 forms a band-pass filter centred, in this instance, on a frequency of $\delta f/4$ and having a bandwidth of the order of $\delta f/5$. The tuned oscillator 4 oscillates initially at its lowest frequency, so that there will be no outputs from the amplifier 5 or the phase comparator 6. The detector 10 will provide a negative output, implying that no signal is present, and the trigger circuit 21 will be off. The trigger circuits 23, 24 and 29 will also be off, the gate 22 will be closed and the gate 31 will be open.

If the wiper arm 26 is now moved on to the next more negative stud, the voltages on the wiper arm 26 will be instantaneously more negative than the voltage on the capacitor C3 and the trigger circuit 29 will remain off. However, the frequency of the tuned oscillator 4 will now approach, from below, a frequency $\delta f/4$ below the lowest comb frequency passed by the filter 20. The mixer 3 will, therefore, begin to produce an output frequency which is initially somewhat greater than $\delta f/4$. The amplifier 5 is, as hereinbefore stated in this case, tuned to a centre frequency of $\delta f/4$ and as the output frequency of the mixer 3 approaches $\delta f/4$, the amplitude of the output of the amplifier 5 will increase until the detector 10 gives a positive output. When this happens, the trigger circuit 21 will be put on, sending a pulse through the diode D3 which puts on the trigger circuits 23 and 24. The gate 22 is opened and the monostable trigger circuit 33 generates a pulse which passes through the gate 22 to the counter and display 30. The trigger circuit 29 being still off, the counter and display 30 registers a positive increment of frequency. At the same time, the frequency of the input to the phase comparator 6 from the amplifier 5 approaches $\delta f/4$ which is the frequency of the oscillator 7(*a*) providing the other input of the phase comparator 6. The output of the comparator 6 is fed back in the correct sense to lock the tuned oscillator 4 to a frequency $\delta f/4$ below the lowest comb frequency passed by the filter 20.

If now the wiper arm 26 is moved to pick up a still more negative voltage, the tuned oscillator 4 will be forced out of the locking range and the output from the amplifier 5 will diminish in amplitude. When this happens, the output of the detector 10 will eventually go negative and trigger circuit 21 will be put off, closing the gate 22. The trigger circuit 23 will also be put off via the diode D2 but the trigger circuit 24 will remain on. As the frequency of the tuned oscillator then approaches, from below, a frequency of $\delta f/4$ above the first comb frequency, the amplitude of the output from the amplifier 5 once again increases so that the output from the detector 10 eventually becomes positive enough to put the trigger circuit 21 on. Thus the gate 22 is again opened. Also the trigger circuit 23 is put on and the trigger circuit 24 is put off via the diode D3, which inverts the output from the phase comparator 6. The monostable trigger circuit 33 generates a pulse which passes through the gate 22 to increase the count of the counter and display 30, the trigger circuit 29 still being off. The output from the phase comparator 6 is now fed back in the correct sense to lock the tuned oscillator 4 to a frequency of $\delta f/4$ above the first comb. frequency. This sequence of events is repeated as the voltage on the wiper arm 26 becomes progressively more negative. A similar sequence of events takes place in an opposite sense when the voltage on the wiper arm 26 is made progressively more positive.

It will be noted that the frequencies to which the tuned oscillator becomes locked are spaced $\delta f/2$ apart. The linearising circuit R5, R6, R7, D4, provides a greater change of control voltage for a given change of the position of the wiper arm 26 when the negative control voltage is large, thus compensating for non-linearity of control of the varactor tuned oscillator 4.

Now let it be supposed that the tuned oscillator is locked to a frequency $\delta f/4$ above a comb frequency and that the direction of tuning is then changed. Initially, the trigger circuits 21 and 23 are on and the trigger circuits 24 and 29 are off. When the direction of movement of the wiper arm 26 is reversed, the voltage on the wiper arm 26 becomes instantaneously more positive than the voltage on the capacitor C3 and, consequently, the trigger circuit 29 is put on. Because the trigger circuit 21 is on, the gate 31 is shut and thus the only effect of the trigger circuit 29 being put on is to reverse the direction of count of the counter and display 30. As the frequency of the tuned oscillator 4 is forced out of lock, the trigger circuits 21 and 23 are put off as before. Similarly when the frequency of the tuned oscillator 4 approaches from above the frequency of $\delta f/4$ below the comb frequency, the trigger circuits 21 and 23 are put on and a reverse count is recorded on the counter and display 30. Also the trigger 24 is put on to control the phase comparator 6 so that its output is fed back in the correct sense to bring the tuned oscillator 4 into lock. A similar sequence of events takes place when the direction of tuning is reversed in the opposite sense when the tuned oscillator 4 is in lock.

Now let it be supposed that the tuned oscillator 4 is once more locked to a frequency $\delta f/4$ above a comb frequency and is forced in the same direction as before (of increasing frequency) out of lock before the direction of tuning is reversed. Once again, the trigger circuits 21 and 23 are initially on and the tripper circuits 24 and 29 are initially off. When the wiper arm 26 is moved to pick up a more negative voltage, the tuned oscillator is forced out of lock in a direction of increasing frequency. The trigger circuits 21 and 23 are put off, the gate 22 is shut and the gate 31 is opened. If now the direction of tuning is changed, by changing the direction of movement of the wiper arm 26, the voltage on the wiper arm 26 will go more positive than the voltage on the capacitor C3 and, consequently, the trigger circuit 29 will be put on. On this occasion, not only is the counter and display 30 set to count in the reverse direction, but also a pulse from the trigger circuit 29 will pass through the gate 31 (now open) and will be inverted in the inverting amplifier 32 to put the trigger circuits 23 and 24 on. Since the gate 22 is shut, no alteration in count will be recorded by the counter and display 30. As the frequency of the tuned oscillator 4 this time approaches, from above, a frequency $\delta f/4$ above the comb frequency, the trigger circuit 21 will again be put on and the trigger circuit 23 will be held on via the diode D1. However, the trigger circuit 24 will be put off by a pulse via the diode D3, so that once again the signal fed back from the phase comparator 6 will be in the correct sense to produce lock of the tuned oscillator 4. A similar sequence of events take place when the direction of tuning is changed in the opposite direction and the tuned oscillator is out of lock. After the tuned oscillator has been brought into lock, the sequence of events proceeds normally until the next change in direction of tuning.

It will be noted that whereas normally when the trigger circuit 21 is put on, the trigger circuit 23 is also put on to alter the count of the counter and display 30, when the trigger circuit 29 is put on or off an odd number of times (due to an odd number of tuning reversals) whilst the tuned oscillator 4 is out of lock this alteration of the count will be inhibited because the trigger circuit 23 will already be on when the trigger circuit 21 is next put on. Furthermore, when the tuned oscillator 4 is out of lock and the trigger circuit 29 is put on or off an odd number of times, the trigger circuit 24 changes state so that when the trigger circuit 21 is once more again put on, the trigger circuit 24 is caused to revert to its original state. Thus, the trigger circuit 24 does not effectively change its state in these circumstances and the sense of the signal fed back from the phase comparator 6 to the tuned oscillator 4 remains the same. When the tuned oscillator 4 is out of lock and the sense of tuning is reversed an even number of times the trigger circuits 29, 23 and 24 revert to their original states as if no reversal had taken place.

The inertial network D5, D6, R8, C3 is provided to prevent any frequency change produced by the movement of the wiper arm 26 from being too rapid to be followed by the output of the amplifier 5 and the counter and display 30. It also provides an output controlling, in conjunction with that from the wiper arm 26, the state of the trigger circuit 29. Studs are provided on the potentiometer 25 so that stepped changes in voltage appear on the wiper arm 26 as it is moved. These stepped changes are more rapid than any consequential change of voltage on the capacitor C3, so that sufficient voltage difference is obtained to control the trigger circuit 29.

The above-described commutation of the output from the phase comparator 6, in order to obtain the correct sense of feedback to the tuned oscillator 4, may be achieved by commutating by inversion one of the inputs to the phase comparator 6, preferably the input from the reference oscillator 7(*a*). This may be achieved by applying the output from the reference oscillator 7(*a*) to the centre-tap of a transformer primary winding (not shown) and connecting one end or the other of the winding to earth by means of diode switches (not shown) under the control of the outputs Q and $\bar{Q}$ of the trigger circuit 24. An output from a secondary winding (not shown) of the transformer may then be applied to one input of a conventional phase discriminator. By this means the output of the reference oscillator 7(*a*) is applied to the phase discriminator in phase or in antiphase according to the state of the trigger circuit 24, whereby the required control of the sense of the output from the phase comparator 6 is achieved.

The voltage tuned oscillator 4 may consist of a transistor having a resonant line coupling between its base and its collector. In such an arrangement, a varactor diode is coupled across the resonant line and voltages derived from the phase comparator 6 and the potentiometer wiper 26 are imposed across the varacter diode to control the frequency of the oscillator.

It is sometimes desirable that a synthesiser should be tuned in accordance with digital instructions received from, for instance, a digitiser or a digital computer. FIGURE 3 shows a circuit for providing digital tuning for a synthesiser such as that shown in FIGURE 2.

FIGURE 3 shows a counter and display 30 connected to receive count pulses from the gate 22 (FIGURE 2) and an input from the trigger circuit 29 controlling the direction of count. A digitiser 40 provides a digital input to the counter and display 30. An output from the counter and display 30 is applied to the base of a pnp transistor Q1. The collector of the transistor Q1 is connected to a negative voltage supply through a switch S1. The emitter of the transistor Q1 is connected to one input of a motor M, the other input of which is connected to earth. The shaft of the motor M is connected to a stepped rotary potentiometer 41. The output of the potentiometer 41 is connected to a switch S2. The switch S2 connects either the potentiometer 41 or the wiper 26 (FIGURE 2) to the tuned oscillator 4 via the linearising and inertial circuits shown in FIGURE 2.

The operation of the circuit shown in FIGURE 3 will now be explained. With the switch S1 open the switch S2 is operated to connect the wiper 26 to the oscillator 4, the synthesiser is tuned as described with reference to FIGURE 2. When the switch S1 is closed and switch S2 is operated to connect the potentiometer 41 to the tuned oscillator 4, the transistor Q1 conducts and the motor M is energised to drive the potentiometer 41. The potentiometer 41 is so arranged that when it is continuously driven it controls the tuned oscillator 4 so that its frequency moves continuously up and down its tuning range. However, when the count on the counter and display 30 equals the number fed thereto by the digitiser 40, the counter and display 30 applies a positive voltage to the base of the transistor Q1 to cut the transistor off. The motor is thus stopped when the tuned oscillator 4 is locked, or on the point of locking, to the frequency corresponding to the number represented at the output of the digitiser 40. On changing the digital output from the digitiser 40, the transistor Q1 again conducts and the above-described events are repeated.

By modifying the counter and display 30 it is possible to adapt it to receive a number of digital values. By breaking the line to the transistor Q1 at P it is then possible to make the synthesiser step on from the frequency demanded by one digital value to the next. It is, in this case, desirable that a device, such as a monostable trigger circuit, be introduced into the circuit so that the break at the point P is imposed for a precise time.

The synthesiser hereinbefore described may be used as a local oscillator in a first frequency changer of a superheterodyne receiver and the counter and display 30 may then be used to display either the frequency of the synthesiser or the radio-frequency signal received by the receiver. A second local oscillator may then be used in a second frequency changer to give interpolation of fine tuning of the receiver. A digitiser associated with the second local oscillator may then be connected to the counter and display 30 to indicate (in terms of fractions of $\delta f/2$) the local oscillator frequency or the radio-frequency received by the receiver.

Many modifications of the synthesiser described with reference to FIGURE 2 will occur to those versed in the art. For example, the reference oscillator 7($a$) and its crystal 7($b$) may be omitted and the phase comparator 6 may then be replaced by a frequency discriminator having a centre frequency equal to the centre frequency of the band-pass amplifier 5, as illustrated by FIGURE 4. In this case, the trigger circuit 24 must be arranged to act upon the output of the frequency discriminator so that the feedback to the tuned oscillator 4 is in the correct sense. The use of a frequency discriminator has the disadvantage that, whereas with a phase comparator only a small phase error is present in the control loop, with a frequency discriminator there is a small frequency error.

The centre frequency of the amplifier 5 is not necessarily $\delta f/4$ or $3\delta f/4$ but may alternatively have any other value represented by the expression $(2m-1)\delta f4$, where $m$ is a positive integer. That is to say, the centre frequency may be any odd multiple of $\delta f/4$. The amplifier 5 of FIGURES 1 and 2 should have a bandwidth of not greater than $\delta f/2$. A threshold circuit may be included in the amplifier 5 to prevent operation on small spurious signals generated, for example, in the mixer 3.

The synthesiser may be modified so that the tuned oscillator locks on to signals $\delta f$ apart instead of $\delta f/2$ apart. To achieve this, the trigger circuit 24 may be connected to cause the suppression of each alternate response by the phase comparator 6 (or its equivalent frequency discriminator) instead of inverting it and to inhibit the response of the counter 30 to each alternate amplitude rise of the output of the amplifier 5.

It is not essential to use a mechanically driven potentiometer, such as the potentiometers 25 (FIGURE 2) and 41 (FIGURE 3), to obtain a voltage for forcing changes in the frequency of the tuned oscillator 4. The potentiometer could, for example, be replaced by a digitiser or the like, the output of which is applied to a digital-to-analogue converter. The output of the digital-to-analogue converter would then be applied to the resistor R5 shown in FIGURE 2.

The digital counter and display shown in FIGURE 2 can be electronic or mechanical, the maximum rate of change of frequency imposed by the inertial circuit being chosen accordingly.

I claim:

1. A frequency synthesiser comprising a stable oscillator, harmonic generator means connected to the stable oscillator for providing a comb-like spectrum of signals having equally spaced frequencies $\delta f$ apart, a controlled oscillator, a mixer connected to the output of the controlled frequency oscillator and to the output of the harmonic generator, a band-pass filter connected to the output of the mixer, the centre frequency of the band-pass filter being an odd multiple of $\delta f/4$ and the bandwidth of the band-pass filter being not greater than $\delta f/2$, reference means for providing a reference signal, a phase comparator having an input connected to the output of the filter and another input connected to the reference means for providing an output representative of the phase deviation of the filter output signal from the phase of the reference signal, means connecting the output of the phase comparator to a control input of the controlled frequency oscillator for locking the frequency thereof, a detector connected to the output of the filter, a digital counter, means for altering the content of the counter by a unit increment when the output from the detector reaches a predetermined threshold level, and means for applying a signal to the controlled frequency oscillator to force it to change its frequency of oscillation.

2. A frequency synthesiser as claimed in claim 1 and wherein the reference means comprises a second stable oscillator for providing a reference signal of a frequency equal to the centre frequency of the filter.

3. A frequency synthesiser as claimed in claim 1 and also comprising means for changing the sense of control of the controlled frequency oscillator by the phase comparator each time the output from the detector reaches the predetermined level.

4. A frequency synthesiser as claimed in claim 3 and wherein the means for changing the sense of control includes means for commutating by invertion one of the inputs to the phase comparator.

5. A frequency synthesiser as claimed in claim 1 and wherein the means for applying a signal to the controlled frequency oscillator to force it to change its frequency of oscillation comprises a variable voltage source and an inertial circuit connected between the variable voltage source and the controlled frequency oscillator, the inertial circuit being arranged so that its output voltage follows the input voltage thereto after a time delay.

6. A frequency synthesiser as claimed in claim 5 and wherein the variable voltage source comprises a potentiometer.

7. A frequency synthesiser as claimed in claim 5 and also comprising means for detecting the sense of deviation of the input of the inertial circuit relative to its output and for controlling the sense of count of the counter according to the sense of deviation.

8. A frequency synthesiser as claimed in claim 5 and also comprising a digitiser, means within the counter for comparing the output from the digitiser with the count on the counter, a motor arranged to vary the voltage of the variable voltage source and means for controlling the motor so that it is stopped when, and only when, the count on the counter corresponds to the output of the digitiser.

9. A frequency synthesiser as claimed in claim 6, and wherein the potentiometer is arranged to provide stepped voltage outputs.

10. A frequency synthesiser as claimed in claim 1 and wherein there is provided a high pass filter between the harmonic generator and the mixer, the high pass filter passing only those frequencies which lie more than $\delta f/4$ above the lowest frequency of the controlled frequency oscillator.

11. A frequency synthesiser comprising a stable oscillator, harmonic generator means connected to the stable oscillator for providing a comb-like spectrum of signals having equally spaced frequencies $\delta f$ apart, a controlled frequency oscillator, a mixer connected to the output of the controlled frequency oscillator and to the output of the harmonic generator, a band-pass filter connected to the output of the mixer, the centre frequency of the band-pass filter being an odd multiple of $\delta f/4$ and the bandwidth of the band-pass filter being not greater than $\delta f/2$, a frequency discriminator connected to the output of the filter for providing an output representative of the deviation of the filter output signal from a predetermined frequency, means connecting the output of the frequency discriminator to a control input of the controlled frequency oscillator for locking the frequency thereof, a detector connected to the output of the filter, a digital counter, means for altering the content of the counter by a unit increment when the output from the detector reaches a predetermined threshold level, and means for applying a signal to the controlled frequency oscillator to force it to change its frequency of oscillation.

12. A frequency synthesiser as claimed in claim 11 and wherein the frequency discriminator has the same centre frequency as the filter.

13. A frequency synthesiser as claimed in claim 11 and wherein there is provided means for changing the sense of control of the controlled frequency oscillator by the frequency discriminator each time the output from the detector reaches the predetermined level.

14. A frequency synthesiser as claimed in claim 11 and wherein the means for applying a signal to the controlled frequency oscillator to force it to change its frequency of oscillation comprises a variable voltage source and an inertial circuit connected between the variable voltage source and the controlled frequency oscillator, the inertial circuit being arranged so that its output voltage follows the input voltage thereto after a time delay.

15. A frequency synthesiser as claimed in claim 14 and wherein the variable voltage source comprises a potentiometer.

16. A frequency synthesiser as claimed in claim 14 and wherein there is provided means for detecting the sense of deviation of the input of the inertial circuit relative to its output and for controlling the sense of count of the counter according to the sense of deviation.

17. A frequency synthesiser as claimed in claim 14 and wherein there is provided a digitiser, means within the counter for comparing the output from the digitiser with the count on the counter, a motor arranged to vary the voltage of the variable voltage source and means for controlling the motor so that it is stopped when, and only when, the count on the counter corresponds to the output of the digitiser.

18. A frequency synthesiser as claimed in claim 15, and wherein the potentiometer is arranged to provide stepped voltage outputs.

19. A frequency synthesiser as claimed in claim 11 and wherein there is provided a high pass filter between the harmonic generator and the mixer, the high pass filter passing only those frequencies which lie more than $\delta f/4$ above the lowest frequency of the controlled frequency oscillator.

20. A frequency synthesiser as claimed in claim 3 and also comprising means for changing the sense of control of the controlled frequency oscillator by the phase comparator each time the direction of tuning of the controlled frequency oscillator is reversed while the output of the detector is below the predetermined level.

21. A frequency synthesiser as claimed in claim 13 and also comprising means for changing the sense of control of the controlled frequency oscillator by the phase comparator each time the direction of tuning of the controlled frequency oscillator is reversed while the output of the detector is below the predetermined level.

22. A frequency synthesiser as claimed in claim 7 and also comprising means for inhibiting a count of the counter when the sense of deviation is reversed any odd number of times while the output of the detector is below the predetermined level.

23. A frequency synthesiser as claimed in claim 16 and also comprising means for inhibiting a count of the counter when the sense of deviation is reversed any odd number of times while the output of the detector is below the predetermined level.

References Cited

UNITED STATES PATENTS 3,221,266 11/1965 Vitkovits ------------ 331—19

FOREIGN PATENTS 993,401 7/1951 France.

ROY LAKE, *Primary Examiner.*

S. H. GRIMM, *Assistant Examiner.*

U.S. Cl. X.R.

331—25, 30, 179

UNITED STATES PATENT OFFICE
CERTIFICATE OF CORRECTION

Patent No. 3,427,561 Dated February 11, 1969

Inventor(s) Ronald Hamer

It is certified that error appears in the above-identified patent and that said Letters Patent are hereby corrected as shown below:

In Column 3, line 4, delete the "." (period) and the words "Also as the difference" and substitute -- to lock its phase and --;

In Column 3, line 4, delete "cillator" and substitute -- oscillator --;

In Column 3, line 4, delete "approaches" and substitute -- so that --;

In Column 5, line 4, between "mixer" and the "." (period) insert the numeral -- 3 --;

In Column 9, line 39, delete "of" and substitute -- or --.

SIGNED AND SEALED
JUN 23 1970

(SEAL)
Attest:

Edward M. Fletcher, Jr.
Attesting Officer

WILLIAM E. SCHUYLER, JR.
Commissioner of Patents